(No Model.)

J. M. DODGE.
DRIVE CHAIN.

No. 352,742. Patented Nov. 16, 1886.

WITNESSES:
J. Henry Kaiser
Harry L. Amer

INVENTOR
James M. Dodge
By J. N. McIntire
ATTORNEY

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

DRIVE-CHAIN.

SPECIFICATION forming part of Letters Patent No. 352,742, dated November 16, 1886.

Application filed September 6, 1886. Serial No. 212,784. (No model.)

*To all whom it may concern:*

Be it known that I, JAMES M. DODGE, of Philadelphia, in the county of Philadelphia and State of Pennsylvania, have invented a new and useful Improvement in Drive Chains; and I do hereby declare that the following is a full, clear, and exact description thereof, reference being had to the accompanying drawings, making part of this application.

My invention relates to carrier attachments for drive-chains; and it consists in a novel construction and arrangement of devices, applicable especially to that kind of drive-chain forming the subject of United States Letters Patent granted to me on the 12th day of September, 1882, in which the rectangular open links in the species of cable-chain are connected or coupled together through the media of metallic bearing-blocks or devices in grooves or receptacles, in which devices are seated and bear the working ends of the coupled parts of the chain-links.

My invention consists, essentially, in the combination, with the connecting-sections or coupler-blocks of the species of chain above mentioned, of a projecting duplex stand or bracket adapted to support any suitable carrier flight or float which may be secured thereto, and which at the same time does not interfere with the working of the links combined with such connecting section or block, all as will be hereinafter more fully explained.

To enable those skilled in the art to which my invention relates to make and use the same, I will now proceed to describe it more fully, referring by letters to the accompanying drawings, which form a part of this specification, and in which I have shown my invention carried out in that form which is about the best now known to me, and in which I have so far successfully practiced it.

Figure 1:
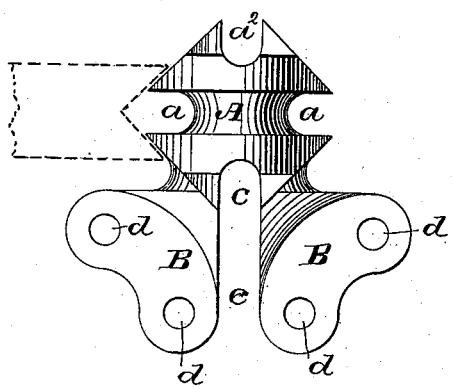
Figure 2:
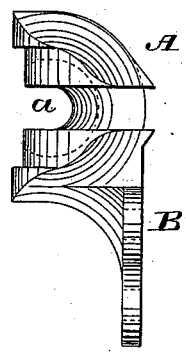
Figure 3:
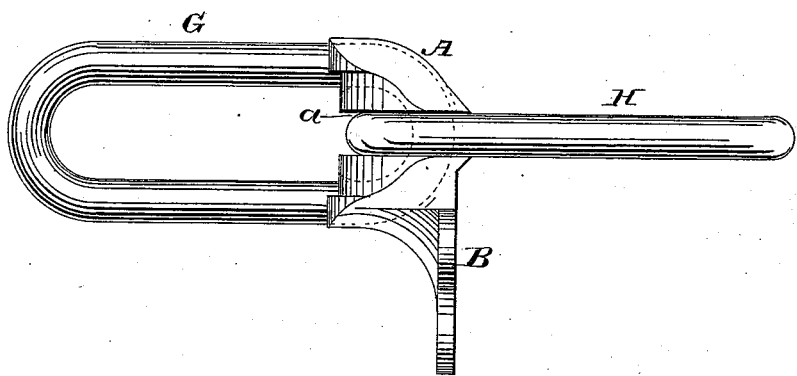

In the drawings, Figure 1 is a face view of the connecting sections or blocks, such as used in the chain shown in my said patent, formed or provided with a duplex stand or bracket-like projection, according to my present invention. Fig. 2 is an edge view of the devices shown at Fig. 1. Fig. 3 is a view showing the device in the same position as seen at Fig. 2, but with two links of the cable-chain coupled or engaged with the said connecting section or bearing; and in the several figures the same parts will be found designated by the same letter of reference.

A is the bearing-block or coupler-connection, and G and H, respectively, are two coupled links of a cable-chain, combined with said block device A, in substantially the manner and for the purposes shown and described in my said patent of September 12, 1882. The block A is, however, in the present case formed or provided with a sort of duplex laterally-projecting stand or carrier device, B, which is formed, preferably, with holes $d$, for the convenient attachment to said projecting stand of any suitable flights or floats, such as said stand is designed to support or carry. It will also be observed that the said bearing-block or coupler-connection A is not only formed with a surrounding groove or recess, $a$, for the seating of the end of one of the links of the chain, and another groove or recess, $a^2$, for the seating of the next adjacent link, but is also shaped so that the chain comprising the links and coupler-blocks, as shown, may run upon a wheel having a V-shaped groove in its periphery, in either one of two directions or ways—namely, either with the carrier attachment B projecting in plane with the wheel on which the chain may be run, or with this attachment projecting in a plane transverse to that at which the chain runs, and in which the said wheel runs, as illustrated by the dotted lines at Fig. 1, showing the last-named relative position of the chain with the chain wheel or pulley.

It will be observed that the attachment device or projecting stand B, which I heretofore refer to as a sort of a duplex stand, is bifurcated or cut away at $c\ c$; and it will be understood that this conformation is indispensable, in order to permit the passage of one of the links to the seat in the block A, in which it is designed to be placed and to work. In this particular my attachment stand or device B is, of course, essentially different from all attachment stands or projections which are formed on or secured to the links proper of drive-chains.

Of course the size and shape of the stand or attachment device B may be varied more or less, without departing from the gist of my invention, so long as it may be permanently secured to the bearing-block or connecting-section A in substantially the manner, and so as to operate for substantially the purpose, herein shown and described; and it will further be understood that the two novel features shown and described—that is, the combination, with the block device A, of the laterally-projecting bifurcated or duplex stand B, and the peculiar conformation of said block A, adapted to run in engagement with a wheel having a groove in its periphery—in either one or another of two arrangements of the chain on the wheel, may be used separately, instead of together, with more or less advantage, if so desired.

What I claim as new, and desire to secure by Letters Patent, is—

1. In a drive-chain or carrier-chain composed of alternate links and intermediate connecting-sections or bearer-blocks, A, substantially as specified, the combination, with said block A, of a laterally-projecting duplex or bifurcated flight or carrier attachment or stand B, substantially as and for the purposes hereinbefore set forth.

2. In a drive-chain or carrier-chain composed of alternate links and connecting bearer blocks or sections adapted to run in or engage with a V-shaped groove in the periphery of a wheel, the combination, with the links, of bearer-blocks formed of or provided with two sets of V-shaped bearing-surfaces located in transverse planes, all substantially in the manner hereinbefore set forth, for the purposes specified.

In witness whereof I have hereunto set my hand this 2d day of August, 1886.

JAMES M. DODGE.

In presence of—
D. S. GARWOOD,
EDWARD H. BUN.